(12) United States Patent
Cook et al.

(10) Patent No.: US 6,541,101 B1
(45) Date of Patent: Apr. 1, 2003

(54) PRINTABLE LAMINATE WITH VISCOELASTIC LAYER

(76) Inventors: Colin J. Cook, 2 Lombardy Close, Pitsea, Essex SS13 2RE (GB); Hazel A. Warden, 48 Tawney Avenue, Upminster, Essex RM14 2EP (GB)

(*) Notice: Subject to any disclaimer, the term of this patent is extended or adjusted under 35 U.S.C. 154(b) by 0 days.

(21) Appl. No.: 09/532,216

(22) Filed: Mar. 22, 2000

Related U.S. Application Data

(63) Continuation-in-part of application No. 09/232,030, filed on Jan. 15, 1999, now abandoned, which is a continuation of application No. 09/107,302, filed on Jun. 30, 1998, now abandoned.

(51) Int. Cl.[7] ............................................. B41M 5/00
(52) U.S. Cl. ....................................... 428/195; 156/235
(58) Field of Search ................................. 428/195, 913, 428/914; 347/105; 156/235

(56) References Cited

U.S. PATENT DOCUMENTS 5,501,902 A * 3/1996 Krouzer ...................... 428/323
5,958,552 A * 9/1999 Fukuda et al. ............... 428/141

* cited by examiner

*Primary Examiner*—Bruce H. Hess
(74) *Attorney, Agent, or Firm*—Alix, Yale & Ristas, LLP

(57) ABSTRACT

A printable laminate film having improved resistance to delamination or separation of the layers of the laminate. The printable laminate comprises a carrier film, a viscoelastic layer on the carrier film, and a single image recording layer on the viscoelastic layer. The viscoelastic materials can be selected from the group consisting of polyurethanes, acrylics, vinyls, butadiene-styrene copolymers, isoprene-styrene copolymers, polychloroprenes, and olefinic polymers.

13 Claims, 2 Drawing Sheets

PRINTABLE LAMINATE WITH VISCOELASTIC LAYER

35 USC 120—CLAIM OF BENEFIT OF EARLIER U.S. FILING DATES

This application is a continuation-in-part of U.S. application Ser. No. 09/232,030 filed Jan. 15, 1999, now abandoned, which was a continuing application based on pending U.S. patent application Ser. No. 09/107,302 filed Jun. 30, 1998 now abandoned, titled "Printable Laminate".

FIELD OF THE INVENTION

The present invention relates to the transfer of a printed image onto a target substrate, especially poster board, foam board, or rigid PVC.

BACKGROUND OF THE INVENTION

A wide variety of techniques have been developed for digitally capturing an image in the form of a computer-readable file, editing the image with a computer, printing the edited image onto a recording medium, and then transferring the image from the recording medium to a target substrate. A target substrate can be one of any number of materials including fabrics, ceramic materials, posterboard, rigid PVC, or mounting board such as, foam board or expanded PVC board which are widely used in the graphic art industry.

The typical recording medium for receiving and transferring an image formed by an ink-jet printer has a carrier and at least two of the following layers: a release layer, a protective barrier layer, image transfer layer, and an adhesive layer. The International Application PCT/GB98/00481 designating in the U.S., filed Feb. 16, 1998 for "Transfer Film" (the disclosure of which is incorporated herein by reference), describes a carrier having a transfer film which has only one layer. This single layer is a mixture of heat-activatable adhesive particles and a binder that also is ink-absorbing, thereby defining a porous matrix. When used for commercial graphics applications, such a transfer film can be adhered to the target substrate without removing the carrier, whereby the carrier remains affixed to the layer holding the printed image, thereby providing physical protection for the image.

U.S. patent application Ser. No. 09/107,302 filed Jun. 30, 1998 for "Printable Laminate" (the disclosure of which is incorporated herein by reference), describes a printable laminate material for transferring an image produced by an ink jet printer to a target substrate. The printable laminate has a carrier film on one side of which is disposed an image recording layer comprising an ink absorber and a heat activatable adhesive. The ink absorber is a modified cellulose material, though a cellulose gum or a single cationically charged water-soluble polymer may also be used. The heat activatable adhesive is a polyurethane. In the '302 application the polyurethane of the image recording layer is in the form of small strand-like structures which are distributed throughout the ink absorber thereby forming an homogenous mixture with the ink absorber of the recording layer.

U.S. Pat. No. 5,501,902 describes a multi-layer printable transfer material which can be sealed at 177° C. using a smoothing iron. However, this temperature is far too high for use with mounting boards commonly found in the graphic arts industry. Furthermore, the '902 Patent describes the use of a powdered polymer with a particle size of up to $20\mu$. The large particle size tends to produce a printed image having a grainy appearance with a consequent loss of clarity, contrast and brilliance of the printed image.

International Patent Application WO 98/02314 describes a printable transfer material that releases from a temporary carrier, wherein the transferred image is waterproof. This material uses a porous matrix of large particles of a typical size of $20\mu$. The transfer material is subjected to a high temperature (typically 190° C.) to form a film of polymer which encapsulates the ink inside the film.

The inventions disclosed in International Application PCT/GB98/00481 and U.S. patent application Ser. No. 09/107,302 have been further investigated, particularly regarding the ability of the printable laminate to resist the separation or delamination of the carrier film from the image recording layer. It was found that cutting or cropping of the printable laminate to obtain a proper size image for display or to obtain a mounted image having an irregular outline as found in some commercial advertising displays often causes the protective carrier layer to separate from the recording layer.

Separation of the carrier film under these circumstances appears to be due to shear, tension and compression forces exerted by the cutting blade during the cutting process. The forces build as the blade is drawn across and through the printable laminate and when the forces imposed in cutting the material are sufficient to overcome the adhesive yield point of the image transfer layer, the adhesive bond between the image recording layer and the carrier layer fails.

Upon failure, the carrier film separates from the image recording layer and the protection offered by the carrier layer is lost. Moreover, separation of the carrier layer can greatly detract from the quality of the printed image in that the separation may cause a "silvering" effect which may obscure the image or otherwise detract from the appearance of the image.

SUMMARY OF THE INVENTION

An object of the present invention is to provide a printable laminate material with improved resistance to delamination of the carrier film from the image recording layer through the use of new heat activated adhesives, new ink absorbers, and combinations thereof in the recording layer.

Another object of the present invention is to provide a printable laminate material having improved resistance to delamination of the carrier film provided by a layer of polymeric material having desirable viscoelastic properties in the structure of the printable laminate.

Other objects will be in part obvious and in part pointed out more in detail hereinafter.

These and related objects are achieved by providing in a first embodiment of the invention a printable laminate comprising a carrier film which is substantially transparent, and an image recording layer which is disposed on the carrier film. The image recording layer comprises a heat activated adhesive and an ink absorber. The heat activatable adhesive is one or more adhesive materials such as polyurethanes, vinyl ester copolymers, acrylics, and ionomers formed from various salts of olefins and unsaturated acid copolymers. The adhesives are most preferable those which are available in the form of aqueous dispersions. The ink absorber is one or more ink absorber materials such as blends of cationic polymers, blends of cationic polymers and cellulose ether, and polyvinyl alcohol. The new adhesives and combinations of adhesives and ink absorbers produce an ink recording layer with a higher yield point, making the laminate less susceptible to delamination.

According to a variation of the first embodiment, the printable laminate consists essentially of a substantially transparent carrier film having opposite first and second sides; a substantially uniform thermoplastic image recording layer having an inner surface directly supported by one side of the carrier film and an exposed outer surface for receiving printed ink; wherein a first, thermoplastic, heat activated adhesive material constitutes about 40–65 weight % of the recording layer, and at least 75 weight % of the remaining weight of the recording layer is constituted by a different, ink absorbing, thermoplastic, cationic polymer material.

In a second embodiment of the invention the printable laminate includes a carrier film which is substantially transparent, a layer of viscoelastic material disposed on the carrier film, and an image recording layer disposed on the layer of viscoelastic material. The viscoelastic material is one or more polymers such as polyurethanes, acrylics, vinyls, butadiene-styrene copolymers, isoprene-styrene copolymers, polychloroprenes, and olefinic polymers having physical properties which contribute to the "damping" of shearing forces imposed by a blade cutting the laminate. The image recording layer includes an ink absorber which may be one or more blends of cationic polymers, blends of cationic polymers and cellulose ether, and polyvinyl alcohol, along with a heat activatable adhesive which may include one or more materials such as polyurethanes, vinyl ester copolymers, acrylic ester copolymers, and ionomers as previously described in reference to the heat activatable adhesives such as polyurethanes, phenoxy resins, acrylics, vinyls, butadiene-styrene copolymers, isoprene-styrene copolymers, polychloroprenes, and olefinic polymers, which may be the same or different than the viscoelastic materials as described herein above. The ink absorber in the image recording layer is the same as described in reference to the ink absorber of the first embodiment, namely one or more ink absorber materials such as blends of cationic polymers, blends of cationic polymers and cellulose ether, and polyvinyl alcohol.

The invention accordingly comprises the several components and the relation of one or more of such components with respect to each of the others, and the article possession of the features, properties, and relation of elements exemplified in the following detailed disclosure.

DETAILED DESCRIPTION OF THE INVENTION

Figure 1:
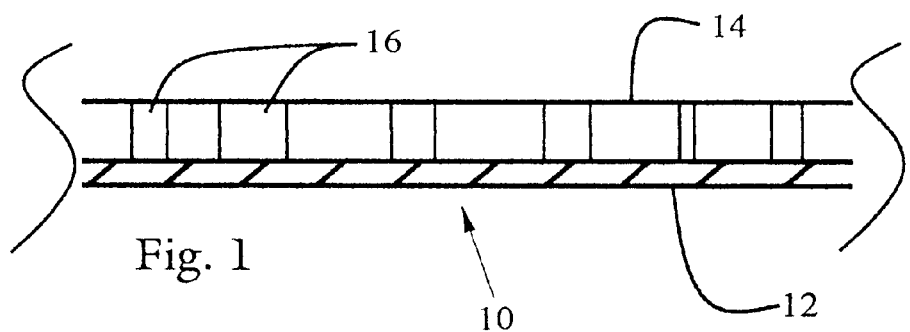
FIG. 1 shows a cross-sectional representation of an embodiment of the printable laminate of the invention which includes a carrier film, and image recording layer.

In the Figures and in the description which follows it will be appreciated that like figures, structures and features will be identified by the same reference numerals.

FIG. 1 shows a printable laminate 10 made according to the first embodiment of the present invention. The printable laminate comprises a substantially transparent carrier film 12 having a first surface and a second surface, and an image recording layer 14 having an inner surface and an outer surface, the inner surface of the image recording layer being directly supported in full and intimate contact on one of the surfaces of the carrier film 12. The exposed outer surface of the image recording layer is intended for receiving an ink image which typically is applied by means of an ink-jet printer (not shown). The pattern of ink deposits 16 formed by the ink-jet printer diffuse through the thickness of the recording layer 14 without substantial degradation.

Figure 2:
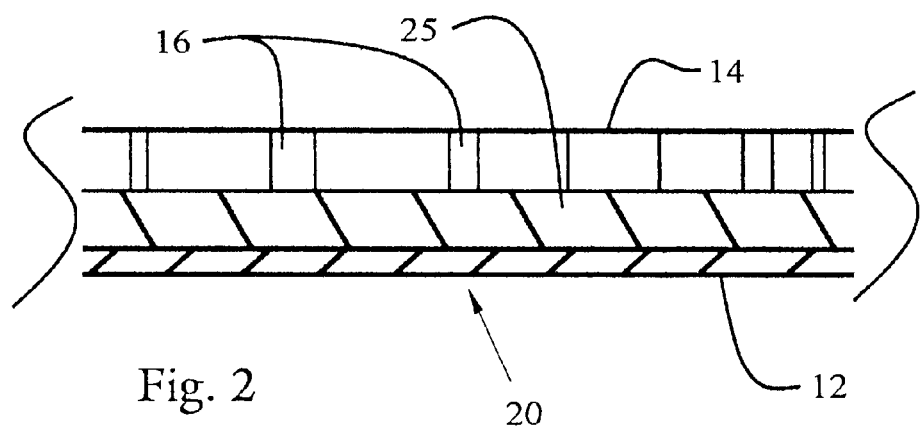
FIG. 2 shows a cross-sectional representation of a second embodiment of the printable laminate of the invention which includes a carrier film, a layer of viscoelastic material and image recording layer.

In FIG. 2, a printable laminate 20 made according to the second embodiment of the present invention is shown. The printable laminate 20 comprises a carrier film 12 having a first surface and a second surface, a layer of viscoelastic material 25 likewise having a first surface and a second surface, the viscoelastic material being directly supported on one of its surfaces in full and intimate contact on one of surface of the carrier film, and an image recording layer 14 having an inner surface and an outer surface, the inner surface being directly supported in full and intimate contact with the other surface of the layer of viscoelastic material. The exposed outer surface of the image recording layer is intended for receiving an image applied by an ink-jet printer (not shown), wherein the image takes the form of a pattern of ink deposits 16 as described above in reference to FIG. 1.

Figure 3:
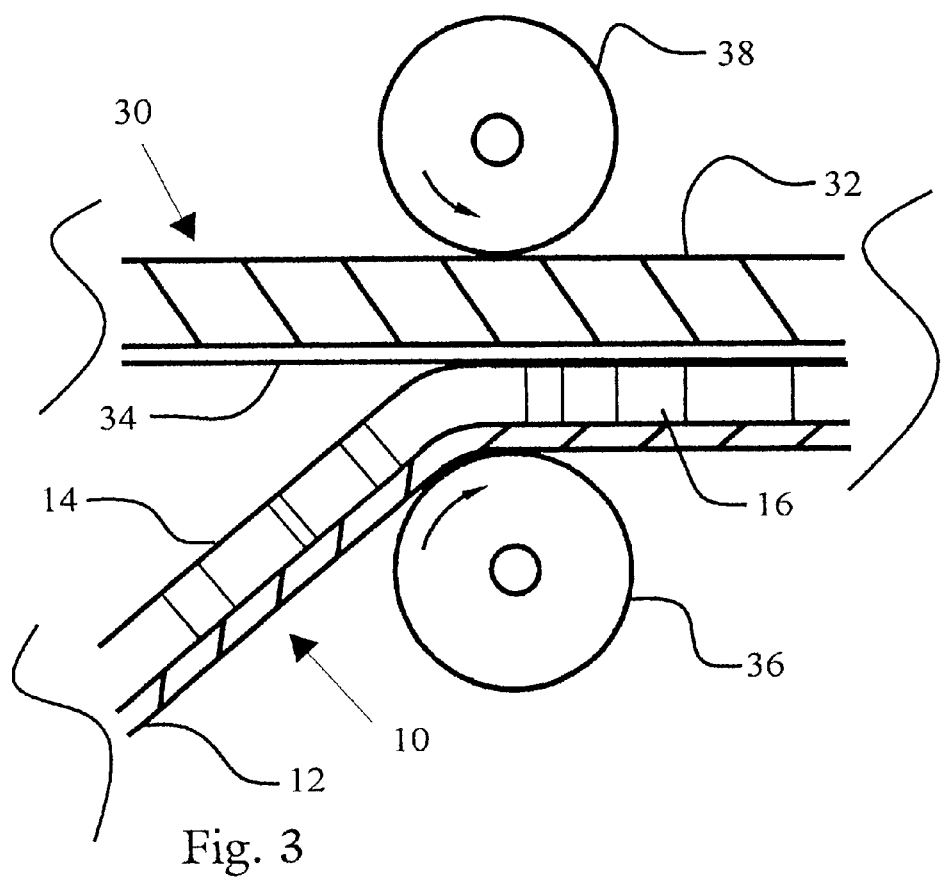
FIG. 3 shows a partial cross-sectional representation of a printable laminate of the invention in the process of being laminated to a target substrate.

In FIG. 3, the printable laminate 10 made according to the first embodiment of the invention is shown in the process of being laminated to a mounting board 30. The mounting board shown here is a substantially rigid, planar structure formed from a layer of expanded polystyrene 32 on at least one side of which is supported a layer of paper 34. The paper provides a convenient surface onto which the printable laminate 10 is adhered. The image recording layer 14 of the printable laminate in FIG. 3 was imprinted with an image by an ink jet printer prior to lamination, as evidenced by the present of ink deposits 16 in the image recording layer.

The image recording layer is heated by contact of the printable laminate with the heated laminating roller 36 to a temperature at which the adhesive in the image recording layer is activated. It is envisioned that other means of heating the image recording layer of the laminate can be used, including the use of heating elements external to the rollers. The mounting board 30 and printable laminate are brought into intimate contact while the adhesive is active and the combination of heat from the laminating roller 36 and pressure from the pinch roller 38 are sufficient to securely adhere the printable laminate to the mounting board.

It will be understood that no melt transfer of the image recording layer or release of the image recording layer from the carrier film is intended in this invention. Rather, the carrier is intended to be retained in place over the image recording layer after the printable laminate has been adhered to the target surface.

The carrier film in the present invention is preferable a clear or substantially clear film having a polymeric composition. Such polymeric film materials suitable for the carrier layer of the invention include polyester, polyvinyl chloride, polyvinyl fluoride, or polypropylene films. In addition, multi-layer carrier films may also be used in this invention, especially when texture on the graphic is desired. One suitable multi-layer film for use in the invention is DEEP CRYSTAL, a laminate of 30μ, textured polypropylene film and 50μ polyester film, available from Assi-Doman, Belgium. CRYSTAL MATT is a similar multi-layer carrier film available from the same supplier. As used herein, "substantially transparent" film should be understood as permitting sufficient passage of light to permit the viewing of an image thereunder.

The surface of the selected film may optionally be treated with chemicals and/or by various processes to improve the adhesion of materials to the film. One such treatment is corona discharge treatment.

The carrier film used in the invention typically has a thickness in the range of 36 to 250µ, with a thickness of approximately 50µ being preferred.

The recording layer of this embodiment of the invention comprising a carrier film and an image recording layer comprises a heat activated adhesive and an ink-absorber. The heat activated adhesive for use in this embodiment of the invention is one or more adhesives selected from the group consisting of polyurethanes, vinyl ester copolymers, acrylic ester copolymers, and ionomeric copolymers. The ink absorbers for use in this embodiment of the present invention include one or more materials selected from the group consisting of blends of cationic polymers, blends of cationic polymers and cellulose ether, and polyvinyl alcohols.

The polyurethanes for use in this invention are exemplified by the materials commercially available as LUPHEN-D available in the grades DS 3507, DS 3459, 200A from BASF Corp., Cheadle, Cheshire, UK; WITCOBOND grades 233-22, 242-67, 280-42 and 755 all available from Baxenden, Droitwich, Worcestershire, UK; and NEOREZ R-563 from Zeneca Resins, Northwich, Cheshire, UK.

Examples of vinyl ester copolymers suitable for use in the invention include materials which are commercially available under the names CRODALAM 29-188 from Croda Adhesives, Newark Nottinghamshire, UK, VINNAPAS available in the grades EPI, EP400, EN424, and EF424, and EF41, and VINNOL CE752, all available from Wacker-Chemie, Munich, Germany.

Examples of suitable acrylic ester copolymers for use in the present invention include GLASCOL grades LS20, and C44, from Ciba Specialty Chemicals, Bradford West Yorkshire, UK; and ACRONAL 290D, from BASF.

The ionomeric copolymers suitable for use in the present invention are metal, ammonium or amine salts formed fro the copolymers of olefins and unsaturated acids. The olefins are most typically $C_2$–$C_{10}$ olefins. The unsaturated acids which are copolymerized with the olefins to form the acidic copolymers are unsaturated acids including acrylic, methacrylic, crotonic, maleic, and many other suitable acids which are will known in the industry. The suitable materials combined with the copolymers to form a salt include metals, and or other neutralizers such as sodium, potassium, zinc, ammonia, and amines. Examples of the ionomeric copolymers are those materials commercially available under the name AQUASEAL grades 1088 and 1127, from Paramelt, Heerhugowaard Netherlands; and ADCOTE 37 R220 from Morton International BV, Amersfoort, Netherlands.

The cationic polymers for use as absorbers in this invention, in general, are polymers which contain trivalent nitrogen or quaternary nitrogen. The trivalent nitrogen can be present as part of a linear or cyclic structure, in functional groups such as primary secondary or tertiary amines or amino-compounds, polyamines, amides, lactams, pyrrolidones, amine oxides, and aromatic nitrogen rings (heterocyclics). The quaternary nitrogen compounds are typically formed by reacting tertiary amines with an alkyl or alkylaryl halide. In principle, any polymer which contains a tertiary nitrogen or ring nitrogen can be converted to a quaternary nitrogen compound. Specific cationic polymers for use in the invention may be selected from the group consisting of vinyl pyrrolidone homopolymer, vinyl pyrrolidone-vinyl ester copolymer, acrylic ester-vinyl pyrrolidone copolymer, acrylic ester-cationic-substituted acrylic monomer copolymer, polyoxazoline, and cationic-substituted acrylic ester-acrylamide copolymer. The vinyl pyrrolidone homopolymers for use in this embodiment of the invention are exemplified by LUVISKOL, grades K30, and K60, commercially available from BASF; PVP K-60 from International Specialty Products, Guildford, Surrey, UK; and GLASCOL DP6-7132 from Ciba Specialty Chemicals. The vinyl pyrrolidone-vinyl ester copolymer of the invention are exemplified by LUVISKOL VA64, from BASF; PVPN/A S-630, from International Specialty Products; and COLLACRAL VL, from BASF. The acrylic ester copolymerized with a cationic-substituted acrylic monomer is available under the name GLASCOL grades DP6-2779, and DP6-2724, from Ciba Specialty Chemicals. The copolymer of cationic-substituted acrylic ester and acrylamide is exemplified by the materials commercially available under the name SEDIPUR grades CL 750, and CF 604, from BASF. The polyoxazolines are exemplified by poly (2-ethyl-2-oxazoline) from Sigma Aldrich Company Limited of Gillingham, Dorset, UK.

Notwithstanding the variety of absorber materials identified above, thermoplastic ink absorbers are preferred. For example another type of absorber material is modified cellulose material and more preferable a thermoplastic modified cellulose material. Suitable ink absorbers include hydroxypropyl cellulose and cellulose gum. One particularly favored thermoplastic modified cellulose is Klucel E modified cellulose powder, commercially available from Hercules, Wilmington, Delaware. Other suitable materials which are not thermoplastic include Blanose cellulose gum (sodium carboxymethylcellulose). These can generally be described as cellulose ether. GLASCOL DP6, mentioned above, is also a suitable but not thermoplastic material.

The polyvinyl alcohols for use of this embodiment of the invention are exemplified by the following: MOWIOL 8-88, ALCOTEX 55-002H, and ALCOTEX SG from Harlow Chemical Company, Harlow, Essex, UK; and POLYVIOL M05/140, from Wacker-Chemie.

The heat activatable adhesive and ink absorber together comprise 90–100% of the total weight of the image recording layer. Preferably, the heat activated adhesive and ink absorber comprise from about 92 to 99% and most preferable, from 97–99% of the total weight of the recording layer. The heat activatable adhesive comprises about 33–77% preferably, about 40–65% of the total weight of the image recording layer, with at least 75% of the remaining weight of the recording layer constituted by a different, ink absorbing, preferably thermoplastic, cationic polymer material. The ink absorber comprises about 20–66%, and preferably about 30–50% of the total weight of the image recording layer. The balance of the image recording layer optionally comprises surfactant and thickener for improving handling and application of the image recording layer in making the printable laminate. The image recording layer formed on the carrier film has a thickness which ranges about 10–45µ with a preferred thickness of about 26µ. The recording layer in this embodiment of the invention is applied to the carrier film in the form of an emulsion, preferably a water-based emulsion, and allowed to dry at a temperature below the film forming temperature of the adhesive. Application of the image recording layer may be carried out by any suitable means, including spreading the image recording material with a doctor blade or other spreading device, drop coating the material, and possibly spraying the material to form a suitable layer. The structure of the dried film is that of particles of adhesive distributed throughout an essentially continuous layer of the water-soluble ink absorber. The size of the adhesive particles can be in the range of 0.08–3.0µ, with a size of approximately 0.1µ being preferred. In addition, the adhesive particles preferably have a strand-like conformation.

In an alternate embodiment of the invention improved resistance to delamination of the carrier film is provided through the inclusion of a layer of an extensible viscoelastic polymeric material incorporated in the structure of the printable laminate. The term "extensible", as used herein, refers to the property of a material to be stretched or otherwise distorted by a given force and resist breakage. In this embodiment of the invention therefore comprises a carrier film, a layer of a viscoelastic material disposed on the carrier film, and an image recording layer disposed on the layer of viscoelastic material.

The carrier film for use in this embodiment of the invention is the same as described above.

The viscoelastic material is a polymer with viscoelastic physical properties which exhibits good adhesion to the carrier film and also to the ink absorbing layer. Desirable properties of the viscoelastic material include a $T_g$ (glass transition temperature) of less than room temperature and typically between $-55°$ C. and $+10°$ C. A modulus (storage modulus, or G') of between $5\times10^5$ and $2\times10^6$ dyne/cm$^2$ is desirable. A viscosity (loss modulus) of between $2.2\times10^5$ and $4\times10^8$ Poise is preferable. As a general description of the physical properties of the viscoelastic material of the invention, the material is extensible in that it resists breakage when subjected to the force or forces applied in cutting or cropping the printable laminate.

Practitioners skilled in the art will recognize the viscoelastic material layer of the invention can be used in combination with the printable laminate as described in U.S. patent application Ser. No. 09/107,302 and other printable laminates, particularly those in which the carrier layer is retained by the laminate.

The viscoelastic material may comprise one or more polymers selected from the group consisting of polyurethanes, acrylics, vinyls, butadiene-styrene copolymers, isoprene-styrene copolymers, polychloroprenes, and olefinic polymers. In the category of vinyls, ethylene-vinyl acetate copolymers are found to be especially suitable for use in the invention.

Specific examples of acrylics useful in this embodiment of the invention include those acrylic polymers commercially available under the name DUROTAK from National Starch and Chemical Company, Slough, Berkshire, UK; ACRONAL grades from BASF.

The vinyls suitable for use in the adhesive layer of this invention include: VINNAPAS EP1, available from Wacker Chemie of Munich, Germany.

Butadiene-styrene copolymers suitable for use in the invention are exemplified by REVINEX 80R10 from Doverstrand Ltd., Harlow, Essex, United Kingdom.

Isoprene-styrene copolymers are exemplified by the materials available from Shell Chemicals UK Limited, Chester, UK, under the name KRATON D and KRATON G.

Polychloroprene is commercially available from Bayer A.G., Dormagen, Germany, under the names DISPERCOLL C and BAYPREN.

Suitable olefinic polymers include polyisobutylene commercially available from BASF, under the name OPPANOL. Other olefinic polymers include polybutadiene and polyisoprene.

The layer of viscoelastic material may contain minor amounts of various materials to improve the performance of the printable laminate. These materials include plasticizers to further improve the desired viscoelastic and extensible properties of the material. In addition, light absorbers may be added to the viscoelastic materials to aid in the filtering of various segments of the light spectrum which are transmitted through the carrier layer and eventually reach the image in the image recording layer. In particular, ultra-violet light absorber materials can be added to the adhesive layer to remove that part of the UV spectrum that would tend to degrade the image held in the ink absorbing layer through the actinating effect of sunlight and artificial light.

Suitable plasticizers, such as phthalate esters, are commercially available from Alcohols Ltd., Bishop's Stortford, Hertfordshire, UK; phosphate esters are available from Ciba, Manchester, UK; and chlorinated paraffin is available from ICI Chlor-Chemicals, Runcorn, Cheshire, UK. Suitable light absorbers are known widely and include such materials sold under the trademark TINUVIN, from Ciba Chemicals, Manchester, UK.

Some of the thermoplastic polymers for use in this embodiment in the invention may be particularly tacky when used at room temperature. Therefore it is envisioned that the carrier film may be treated with a release-coating material on the surface for the film opposite the adhesive layer so that the film can be easily unwound from a spool or roll and unwound as needed for use in printing or mounting of the printable laminate. Such release coatings are commonly known in the adhesives industry and include such materials as ESCOAT P (polyvinyl octadecyl carbamate), commercially available from Emerald Chemicals Ltd, Windsor, Berkshire, UK.

The image recording layer of this embodiment of the invention comprises a heat activatable adhesive and an ink absorber. The heat activatable adhesive is one or more materials selected from the group consisting of polyurethanes, vinyl ester copolymers, acrylic ester copolymers, and ionomeric copolymers, (all as previously described in reference to the heat activatable adhesive found in the image recording layer of the first embodiment of the invention), polyurethanes, acrylics, vinyls, butadiene-styrene copolymers, isoprene-styrene copolymers, polychloroprenes, and olefinic polymers (all as previously described in reference to the viscoelastic material as described above in reference to the present embodiment of the invention) and phenoxy resins. The ink absorbers for use in the present embodiment are selected from the group consisting of blends of cationic polymers, blends of cationic polymers and cellulose ether, and polyvinyl alcohol, (all as previously described in reference to the ink absorber of the first embodiment of the present invention).

The phenoxy resin suitable for use as. a heat activatable adhesive in the recording layer of the invention is exemplified by the resin commercially available under the name PKHW-35, from Phenoxy Associates, Rock Hill, S.C. When a phenoxy resin is used in the image recording layer it may be necessary to use an amphoteric surfactant in combination with the phenoxy resin to act as a charge reverser. Normally, the phenoxy resin us supplied in the form of an anionic dispersion in water and anionic dispersions are not normally compatible with cationic polymers (such as ink absorbers which may be used in the image recording layer). Therefore, the practitioner will appreciate the need for reducing the negative charge of the phenoxy resin through the use of an amphoteric surfactant. The amphoteric surfactant acts as a "bridge" between the anionic phenoxy resin and the cationic polymers in the image recording layer. It will be appreciated that the utility of amphoteric surfactants extends beyond the use in systems using phenoxy resins. In fact, any anionic adhesive used in connection with this invention may have its compatibility with cationic ink absorbers improved though the use of amphoteric surfactants. An example of a suitable amphoteric surfactant is CRODATERIC CYNA, from Croda Surfactants Ltd., Snaith, Humberside, UK.

The viscoelastic material may be deposited directly onto the carrier film in the form of an aqueous dispersion, a solution formed with an organic solvent, or in the form of a hot melt. Typically, the viscoelastic material layer comprises 60–80% by weight of the viscoelastic material layer and the image recording layer combined. Preferably, the viscoelastic material comprises 62.5–80.0% and most preferably, 70.0–75.0% of the combined amount of the viscoelastic material layer and the image recording layer.

Within the viscoelastic material layer, the viscoelastic material may comprise up to 100% by weight of the layer. A plasticizer, if present, may comprise up to 30% by weight of the total weight of the viscoelastic material layer. Similarly, the UV light absorber, if present, comprises about 2.0–5.0% by weight of the total weight of the viscoelastic material layer.

The viscoelastic material layer is typically within the range of 20–50$\mu$ thick, with 25–40$\mu$ being preferable, and 30–35$\mu$ being most preferable.

The recording layer in this embodiment of the invention is applied to the carrier film in the form of an emulsion, preferable a water-based emulsion, and allowed to dry. The structure of the dried film is that of adhesive particles distributed throughout an essentially continuous layer of the water-soluble ink absorber. The size of the adhesive particles is typically in the range of 0.08–3.0$\mu$, with a 0.1$\mu$ particle size being preferred. The adhesive particles have a strand-like conformation.

The ink absorbing layer may be deposited over the adhesive layer in the form of an aqueous solution containing the dispersed adhesive and the layer is dried below the minimum film for forming temperature of the adhesive dispersion.

The heat activatable adhesive and ink absorber together constitute 93–98% of the total weight of the image recording layer. Preferable, the heat activated adhesive and ink absorber comprise from 94–98% and most preferable, from 97–98% of the total weight of the recording layer. The heat activatable adhesive comprises about 48–64% of the total weight of the image recording layer. Preferably, the heat activatable adhesive comprises 50–60% and most preferably, 57.8–59.8% of the total weight of the image recording layer, while the ink absorber comprises 34–50%, preferably 39–49%, or most preferably, 39.2–41.2% of the total weight of the image recording layer. The balance of the image recording layer comprises optionally comprises surfactant and/or a thickener.

The image recording layer may be deposited directly on to the layer of viscoelastic material and subjected to conditions for promoting drying. However, better results may be obtained by depositing the ink recording material on a release sheet, subjecting the material to conditions for promoting drying the image recording layer. When dry, the image recording layer is placed directly on the layer of viscoelastic material. The release sheet may be removed either prior to or subsequent to placing the image recording layer on the layer of viscoelastic material.

Having generally described the invention, the following examples are included for the purposes of illustration so that the invention may be more readily understood and is in no way intended to limit the scope of the invention unless otherwise specifically indicated.

EXAMPLES OF THE INVENTION

A group of samples of the printable laminate having a carrier film and ink absorbing layer were prepared according to Examples 1–6. Examples 1–4 use ink absorbers of which at least one in each formula is thermoplastic, whereas Example 5 and 6 use ink absorbers which are not notably thermoplastic.

Example 1

A piece of carrier film was prepared for coating with an ink absorber layer. The carrier film used was an oriented polypropylene film commercially available under the name ETICOURT ETM, from Hoechst Trespaphan, of Swindon, Wiltshire, UK. The carrier film was found to have a thickness of approximately 57$\mu$.

A mixture of image recording layer material was prepared from the following ingredients in the amounts as indicated:

| Ingredients | Description | Weight Amt. | Dry Weight Amt. |
|---|---|---|---|
| GLASCOL LS20 | (polyacrylate ester) | 50.7 wt. % | 49.6 wt. % |
| deionized water | (diluent) | 24.4 wt. % | — |
| LUVISKOL VA64 | (vinyl pyrrolidone/ vinyl ester copolymer) | 24.4 wt. % | 49.7 wt. % |
| LUMITEN AFK | (surfactant) | 0.5 wt. % | 0.7 wt. % |

The mixture was applied to the carrier film and dried at approximately 50° C. A sufficient amount of the mixture was used so that upon drying the amount of material comprising the ink absorbing layer is approximately 25 grams per square meter.

A test print was made with the laminate by printing an image on the laminate with a CHROMA 24 ink jet printer, commonly available from Encad Inc., San Diego, Calif., USA. Two samples of the printed laminate of this example were prepared in this manner. A first sample was laminated to a piece of foam board of 3 mm thickness and a second sample was laminated to a piece of expanded PVC Board of 3 mm thickness using a roller laminator set to 100° C. at a pressure of 80 psi with a feed rate speed of 2 feet per minute. Subsequent to laminating, the printable laminate and mounting board were permitted to cool to room temperature. Adhesion of the laminate to the target board of each sample was tested using a sample pull test. In the test, a pulling force was applied to the laminate until separation of the printable laminate from the mounting board occurred. If the laminate carries away part or all of the surface paper of the mounting board the quality of adhesion is considered good. If the printable laminate peels away from the mounting board without carrying away a portion of the surface paper, the adhesion is considered poor. In the case of non paper-coated board, if the laminate separates with difficulty from the board or the carrier delaminates from the image containing layer, the adhesion is considered good. The printable laminate of this Example was found to provide good adhesion to the mounting board.

Example 2

Using the same carrier film as in Example 1 a printable laminate was prepared by applying a coating of an ink absorber layer 25 g (dry weight) per square meter, of the laminate. The ink absorber layer was prepared from:

| Ingredients | Description | Weight Amt. | Dry Weight Amt. |
|---|---|---|---|
| AQUASEAL 1127 | (Ionomer | 70.3 wt. % | 48.4 wt. % |
| LUVISKOL VA64 | (vinyl pyrrolidone/ vinyl ester copolymer) | 14.1 wt. % | 48.6 wt. % |
| deionized water | (diluent) | 14.1 wt. % | — |
| 0.88 s.g. ammonia | (neutralizer) | 0.5 wt. % | — |
| boric acid | acidulant, precipitant | 0.7 wt. % | 2.4 wt. % |
| LUMITEN AFK | (surfactant) | 0.3 wt. % | 0.6 wt. % |

The image recording layer was dried and printed with an image as in Example 1 above. A first sample of the printable laminate of Example 2 was laminated to a foam board of 3 mm thickness and a second sample was laminated to an expanded PVC board of 3 mm thickness using a roller laminator set to 100° C. and a pressure of 80 psi, and a feed rate of 2 feet per minute. Adhesion to both the expanded PVC board and foam board was found to be very good.

Example 3A

A printable laminate film was prepared using a corona discharge treated polyester film by depositing the image recording layer material in an amount of 35 g per square meter (dry weight) on the carrier film. The ink absorbing layer was dried at a temperature below 58° C. The formula of the ink absorbing layer is as follows:

| Ingredients | Description | Weight Amt. | Dry Weight Amt. |
|---|---|---|---|
| WICTOBOND 232-22 | (Polyurethane) | 59.2 wt. % | 55.3 wt. % |
| LUVISKOL VA64 | (vinyl pyrrolidone- vinyl ester copolymer) | 16.6 wt. % | 38.8 wt. % |
| deionized water | (diluent) | 16.6 wt. % | — |
| GLASCOL DP6-7132 | (cationic polymer) | 6.7 wt. % | 4.9 wt. % |
| LUMITEN IRA | (surfactant) | 0.9 wt. % | 1.0 wt. % |

After the ink absorbing layer had dried it was printed as an Example 1 with GS Ink Set of a CHROMA 24 Ink Jet Printer. The printed image was allowed to dry and a first sample of the printed image was laminated to a 3 mm foam board and a second sample of the printed image laminated to a 3 mm expanded PVC board using a roller laminator set at 100° C., a pressure of 80 psi, and a feed rate of 2 feet per minute. On peel testing adhesion of the laminate to both the foam board and the expanded PVC board was found to be very high.

Example 3B

| Ingredient | Description | Weight Amt. | Weight in Dry Coating |
|---|---|---|---|
| WITCOBOND 233-22 | (Polyurethane) | 43.48 wt. % | 45.66 wt. % |
| LUVISKOL VA64 | (vinyl pyrrolidone/ vinyl ester Copolymer) | 18.60 wt. % | 48.83 wt. % |

-continued

| Ingredient | Description | Weight Amt. | Weight in Dry Coating |
|---|---|---|---|
| KLUCEL E | (modified Cellulose) | 1.82 wt. % | 4.77 wt. % |
| Water | (diluent) | 34.98 wt % | — |
| LUMITEN IRA | (surfactant) | 0.56 wt. % | 0.74 wt. % |

Example 3B is quite similar to Example 3A except that the ink absorber of Example 3A (a blend of cationic polymers) is further blended with a relatively small amount of cellulose ether. The effective dry weight coat of the image layer according to Example 3B is between about 25–35, preferably 28 to 30, grams per square meter, preferably on the DEEP CRYSTAL or CRYSTAL MATT carrier film previously described. This gives luster and matt products respectively. A simple gloss effect can be obtained by coating polyester film of 50 microns thickness. In this embodiment, the dry weight percent of the polyurethane can be in the range of 40–50%; the range of the cationic polymer blend can be 45–50%; and the range of the cellulose ether can be about 3–10%.

Example 4

A corona discharge treated polyester film was used as the carrier film to which was applied a mixture of the ink absorbing layer material in an amount of 35 g per square meter dry weight. The formula of the image recording layer material is as follows:

| Ingredients | Description | Weight Amt. | Dry Weight Amt. |
|---|---|---|---|
| CRODALAM- 29-188 | (vinyl ester copolymer) | 59.6 wt. % | 57.2 wt. % |
| LUVISKOL VA64 | (vinyl pyrrolidone- vinyl ester copolymer) | 15.8 wt. % | 36.1 wt. % |
| deionized waters | (diluent) | 15.8 wt. % | — |
| GLASCOL DP6-7132 | (cationic polymer) | 7.9 wt. % | 5.7 wt. % |
| LUMITEN IRA | (surfactant) | 0.9 wt. % | 1.0 wt. % |

The ink absorbing layer material was applied to the carrier film and dried at temperature below 58° C. The printable laminate was then printed and laminated to a 3 mm foam board and 3 mm expanded PVC board as described in the previous examples. Peel testing showed that adhesion to both the foam board and the expanded PVC board was very high.

Examples 1–4 support a preference that at least one of the absorber materials have thermoplastic adhesive properties (e.g., the vinyl pyrrolidone-vinyl ester copolymers LUVISKOL VA64, PVPNA S-630 and Collacol VL; Klucel E; and polyoxazoline).

Example 5

As in the examples above a printable laminate was prepared by forming an image recording layer on a corona discharge treated polyester film. The image recording layer had a dry weight of 35 g per square meter and was dried at a temperature below 58° C. The formula of the image recording layer material is as follows:

| Ingredients | Description | Weight Amt. | Dry Weight Amt. |
|---|---|---|---|
| ACRONAL 290D | (vinyl ester copolymer) | 30.3 wt. % | 76.9 wt. % |
| LUVISKOL K90 | (vinyl pyrrolidone-viny ester copolymer) | 4.2 wt. % | 21.3 wt. % |
| deionized waters | (diluent) | 64.8 wt. % | — |
| LUMITEN IRA | (surfactant) | 0.7 wt. % | 1.8 wt. % |

As in the previous examples the printable laminate was printed with an image, allowed to dry, and a sample laminated to a 3 mm foam board and a second sample laminated to a 3 mm expanded PVC board. On peel testing, adhesion to both the foam board and the expanded PVC board was found to be very high.

Example 6

A mixture of ingredients for forming an ink absorbing layer was deposited on to a corona discharge treated polyester film. The dry weight of the ink absorbing layer was about 35 g per square meter. After application of the material, the ink absorbing layer was dried at a temperature below about 58° C. The formula of the ink absorbing mixture was prepared from the following components:

| Ingredients | Description | Weight Amt. | Dry Weight Amt. |
|---|---|---|---|
| WITCOBOND 755 | (polyurethane) | 31.9 wt. % | 57.9 wt. % |
| MOWIOL 8-88 | (polyvinyl alcohol) | 13.4 wt. % | 40.6 wt. % |
| deionized water | (diluent) | 53.8 wt. % | — |
| LUMITEN AFK | (surfactant) | 0.9 wt. % | 1.5 wt. % |

As in previous examples the printable laminate was printed with an ink jet printer. A first sample of the laminate was affixed to the 3 mm foam board and a second sample affixed to a 3 mm expanded PVC board. Peel testing revealed that adhesion to both the foam board and the expanded PVC board was very high.

Examples with Viscoelastic Layers

Additional samples of a printable laminate having a layer of a viscoelastic material according to the present invention were prepared according to Examples 7, 8 and 9.

Example 7

The printable laminate comprising a carrier film, a layer of a viscoelastic polymer and an image recording layer was prepared as follows: A polyester film having a thickness of 23μ was coated with an acrylic copolymer to form the layer of viscoelastic material. The acrylic polymer used is commercially available under the designation 180-1846 from National Starch and Chemical Limited, United Kingdom. The viscoelastic material was applied in an amount equivalent to 30 g per square meter, dry weight.

The image recording layer was formed from a composition as follows:

| Ingredients | Description | Weight Amt. | Dry Weight Amt. |
|---|---|---|---|
| KLUCEL E | (modified cellulose) | 7.6 wt. % | 38.9 wt. % |
| WBV 110 | (vinyl resin) | 22.8 wt. % | 57.1 wt. % |
| deionized water | (diluent) | 68.1 wt. % | — |
| LUMITEN AFK | (surfactant) | 0.7 wt. % | 2.1 wt. % |
| PLURONIC PE6100 | (surfactant) | 0.4 wt. % | 1.9 wt. % |
| Ammonia SG = 0.88 | (neutralizer) | 0.4 wt. % | — |

The image recording layer was first deposited directly on a release liner, such as POLY-SLIK 110–80, available from Rexam Release, Apeldoorn, Holland, at a dry coat weight of 24–28 grams per square meter. The ink recording layer was then laminated to the extensible polymeric layer and the release liner removed. Thereafter, the ink recording layer was printed with an image of a GS Ink Set by a Chroma 24 ink jet printer. The image was permitted to dry and then the printable laminate was attached to a foam board target substrate using a roller laminator set at 100° C., a pressure of 80 PSI, and a feed rate of 2 feet per minute. It was found that an acceptable level of adhesion was obtained between the surface of the ink recording layer and the foam board.

Example 8

In this example a 50μ thick polyester film was coated with a dispersion of a polyurethane (WITCOBOND 233-22) as the extensible polymer in an amount equivalent to 20 g per square meter of film, dry weight.

The image recording layer was prepared according to the formula as follows:

| Ingredients | Description | Weight Amt. | Dry Weight Amt. |
|---|---|---|---|
| LUVISKOL K90 | (vinyl pyrrolidone) | 15.0 wt. % | 97.4 wt. % |
| deionized water | (diluent) | 84.2 wt. % | — |
| LUMITEN IRA | (surfactant) | 0.8 wt. % | 2.6 wt. % |

The image recording layer was formed on the release liner at a dry coat weight in the range of 14–18 grams per square meter, then transferred to the viscoelastic material layer which was previously formed on the carrier film. An image was printed on the outer surface of the recording layer as described in Example 7 above, and a sample laminated to foam board as previously described.

On peel testing it was found that an acceptable level of adhesion was obtained between the image surface and the board. When the same composition of ink recording was coated on to a polyester film with a less viscoelastic primer, it was noted that a negligible level of adhesion was obtained between the film and the image coating. This indicates that the structure and materials of the present invention have greater resistance to delamination than other materials which are known in the art.

Example 9

In this example, the carrier film was coated with viscoelastic polymer (National 180-1846 as in Example 7) at a coat weight of 30 grams per square meter, which was allowed to dry.

The image recording layer was prepared using a phenoxy resin in the formula as follows:

| Ingredient | Description | Weight Amt. | Dry Weight Amt. |
|---|---|---|---|
| PKHW-35 | phenoxy resin | 69.6 wt. % | 77.0 wt. % |
| ammonia | alkali and neutralizer | 0.8 wt. % | — |
| CRODATERIC CYNA | amphoteric surfactant | 1.7 wt. % | 2.5 wt. % |
| NATIONAL 072-0202 | PVA (aqueous solution) | 13.9 wt. % | 9.7 wt. % |
| GLASCOL DP6-7132 | cationic polymer | 11.6 wt. % | 10.8 wt. % |
| deiorized water | (diluent) | 2.4 wt. % | — |

The image recording layer was deposited on a release liner and allowed to dry. The image recording layer was then transferred to the viscoelastic material layer previously formed on the carrier film, at a coat weight in the range of 28–32 grams per square meter. An image was printed on the recording layer and then laminated to foamboard using the conditions of Example 7. An acceptable level of adhesion was obtained between the imaged layer and the foamboard.

As will be apparent to persons skilled in the art, various modifications and adaptations of the structure and materials described above will become readily apparent without departure from the spirit and scope of the invention.

What is claimed:

1. A printable laminate consisting essentially of:
   a substantially transparent film carrier having opposite first and second sides;
   a viscoelastic layer having an inner surface and an outer surface, said inner surface directly supported by one of said sides of the carrier; and
   a thermoplastic recording layer having an inner surface directly supported on the outer surface of said viscoelastic layer and an exposed surface for receiving printing ink;
   wherein said viscoelastic layer comprises one or more extensible, viscoelastic polymers having a glass transition temperature between about −55° C. to about +10° C., a storage modulus of between about $5 \times 10^5$ and about $2 \times 10^6$ dyne/cm$^2$ and a loss modulus of between about $2.2 \times 10^5$ and about $4 \times 8^8$ poise, said viscoelastic polymers selected from the group consisting of polyurethanes, acrylics, vinyls, butadiene-styrene copolymers, isoprenestyrene copolymers, polychloroprenes, and olefinic polymers; and
   said recording layer comprises an ink absorber selected from the group consisting of blends of cationic polymers, blends of cationic polymers and cellulose ether, and polyvinyl alcohol, and a heat activatable adhesive selected from the group consisting of polyurethanes, acrylics, vinyls, vinyl ester copolymers, acrylic ester copolymers, ionomeric copolymers, and phenoxy resins.

2. The printable laminate as claimed in claim 1, wherein:
   in said image recording layer the combined weight of the ink absorber and heat activatable adhesive comprise at least 93% by weight of the recording layer; and
   the viscoelastic polymer constitutes at least 60% by weight of the viscoelastic layer.

3. The printable laminate as claimed in claim 2, wherein a plasticizer constitutes up to 30% by weight of the viscoelastic layer.

4. The printable laminate as claimed in claim 1, wherein the recording layer is a dry film having a structure in the form of particles of heat activatable adhesive of approximately from 0.08 to 3$\mu$ in diameter, distributed within a substantially continuous layer of ink absorber.

5. The printable laminate as claimed in claim 1, wherein the recording layer is substantially clear or becomes clear on application of heat and pressure during sealing.

6. The printable laminate as claimed in claim 5, wherein the carrier is selected from the group consisting of clear polyester, polypropylene, polyvinyl chloride, and polyvinyl fluoride film.

7. A printable laminate comprising:
   a carrier film;
   a viscoelastic layer; and
   an image recording layer;
   wherein said viscoelastic layer comprises one or more extensible viscoelastic polymers.

8. The printable laminate as claimed in claim 7, wherein the image recording layer comprises a heat activatable adhesive and an ink absorbing polymer which together constitute at least 93% by weight of the recording layer; and
   at least 60% by weight of the viscoelastic layer is constituted by at least one viscoelastic polymer.

9. The printable laminate as claimed in claim 8, wherein one viscoelastic polymer is an acrylic copolymer.

10. The printable laminate of claim 8, wherein
    the carrier film is substantially transparent and has a thickness in the range of about 20–200$\mu$,
    the coat weight of the recording layer is in the range of 25–35 grams per square meter and
    the coat weight of the viscoelastic layer is in the range of about 20–30 grams per square meter.

11. A printable laminate comprising in sequence:
    a carrier film;
    a viscoelastic layer constituted by weight of at least 60 percent of one extensible viscoelastic polymer comprising at least polyurethane; and
    an image recording layer comprising a heat activatable adhesive and an ink-absorbing polymer which together constitute at least 93 percent by weight of the recording layer.

12. A printable laminate consisting essentially of:
    a substantially transparent film carrier having opposite first and second sides;
    a viscoelastic layer having an inner surface and an outer surface, said inner surface directly supported by one of said sides; and
    a thermoplastic recording layer having an inner surface directly supported on the outer surface of said viscoelastic layer and an exposed surface for receiving printing ink;
    wherein the viscoelastic layer comprises an acrylic, and wherein said recording layer comprises an ink absorber comprising a blend of cationic polymers, and an adhesive comprising polyurethane.

13. A printable laminate consisting essentially of:
    a substantially transparent film carrier having opposite first and second sides;
    a viscoelastic layer having an inner surface and an outer surface, said inner surface directly supported by one of said sides of the carrier, said viscoelastic layer comprises an acrylic; and a thermoplastic recording layer having an inner surface directly supported on the outer surface of said viscoelastic layer and an exposed surface for receiving printing ink, said viscoelastic layer having at least 60 percent by weight of acrylic, and up to 30% by weight of a plasticizer, said recording layer comprises an ink absorber comprising a blend of cationic-polymers, and an adhesive comprising polyurethane, said recording layer further comprised of at least 93% by weight of the combined ink absorber and heat activatable adhesive.

* * * * *